Aug. 24, 1926.
T. W. HICKS
1,597,234
WEED EXTRACTOR
Filed May 3, 1922    5 Sheets-Sheet 3
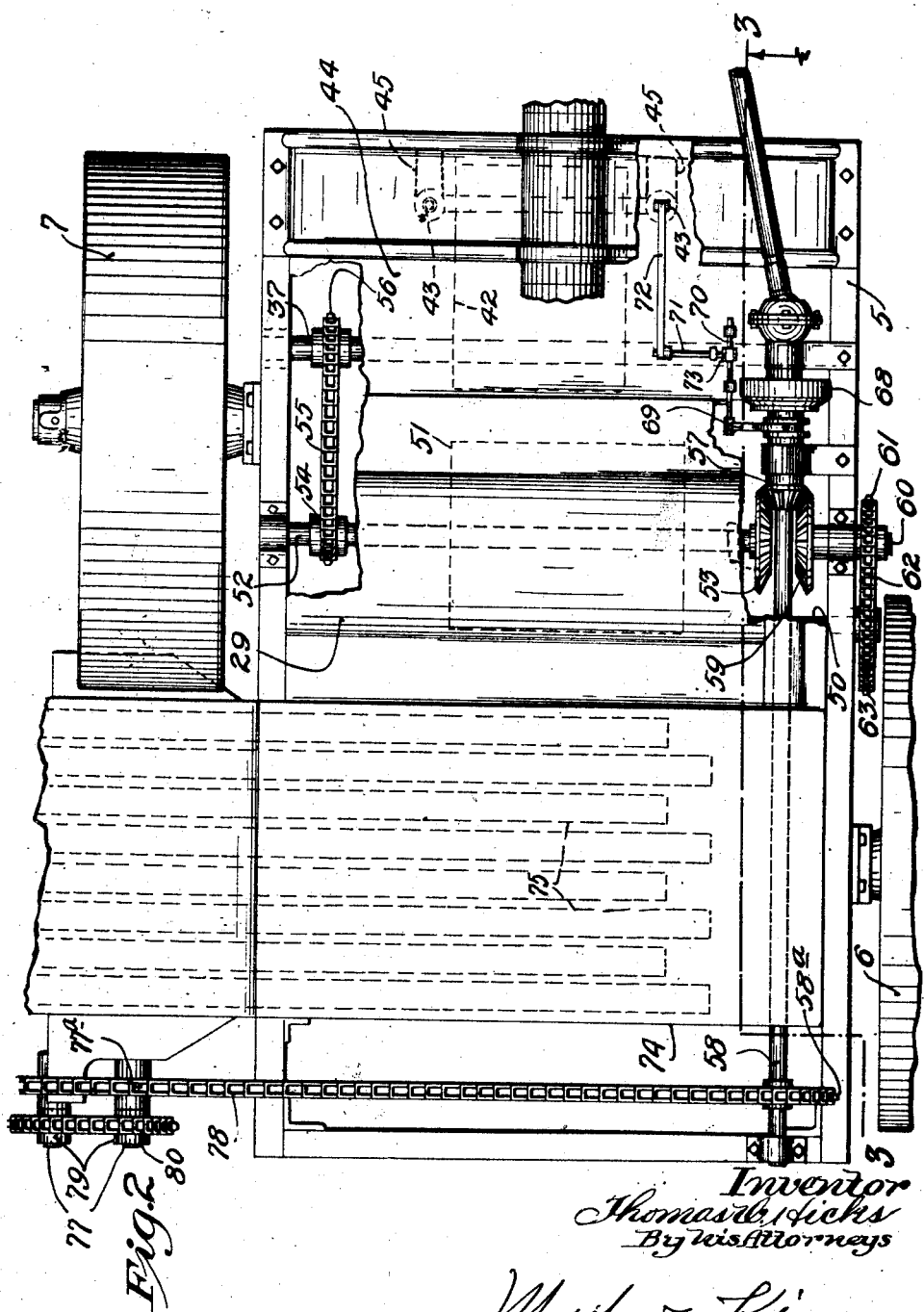

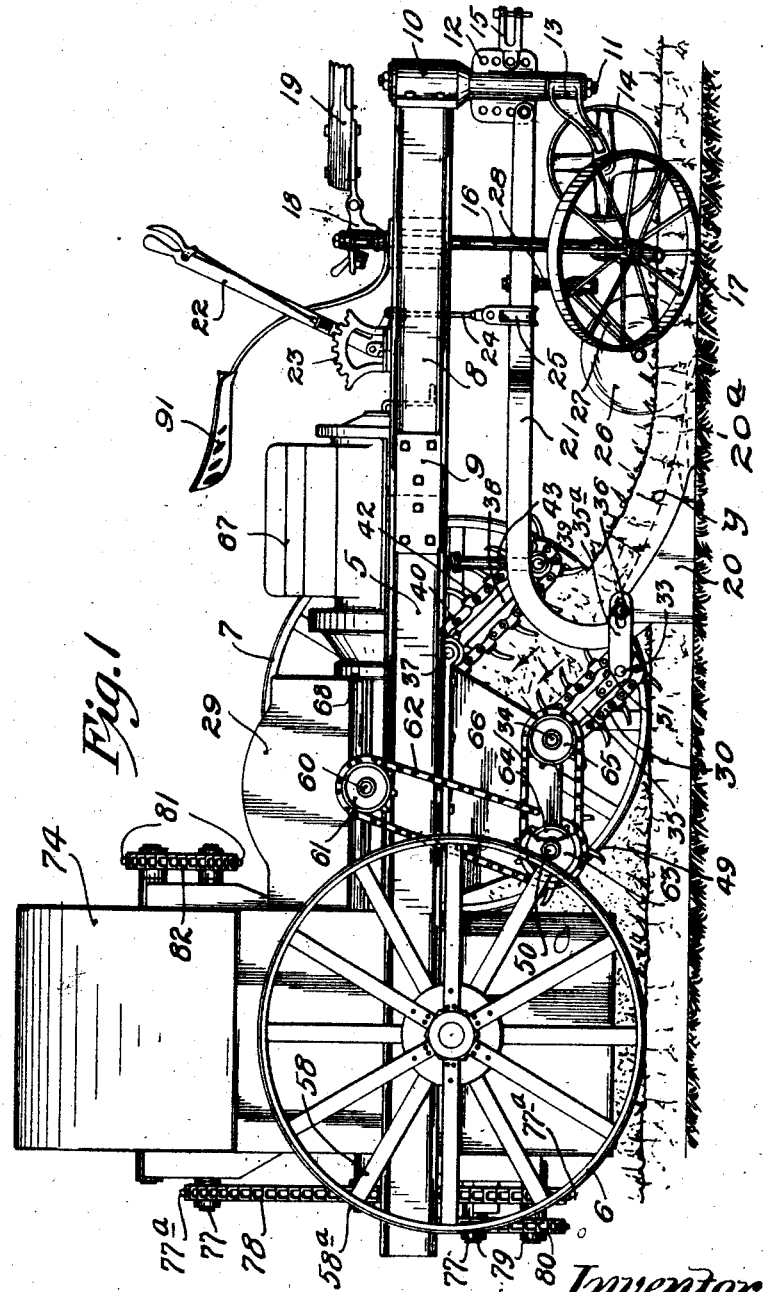

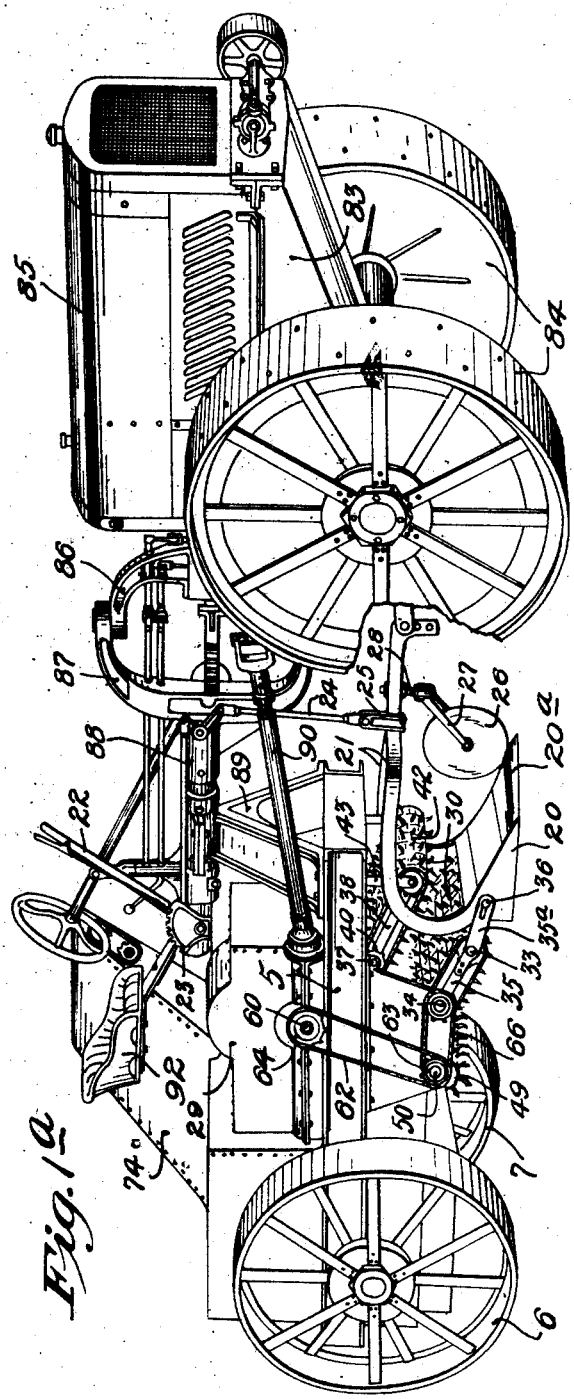

Aug. 24, 1926.
T. W. HICKS
1,597,234
WEED EXTRACTOR
Filed May 3, 1922
5 Sheets-Sheet 4
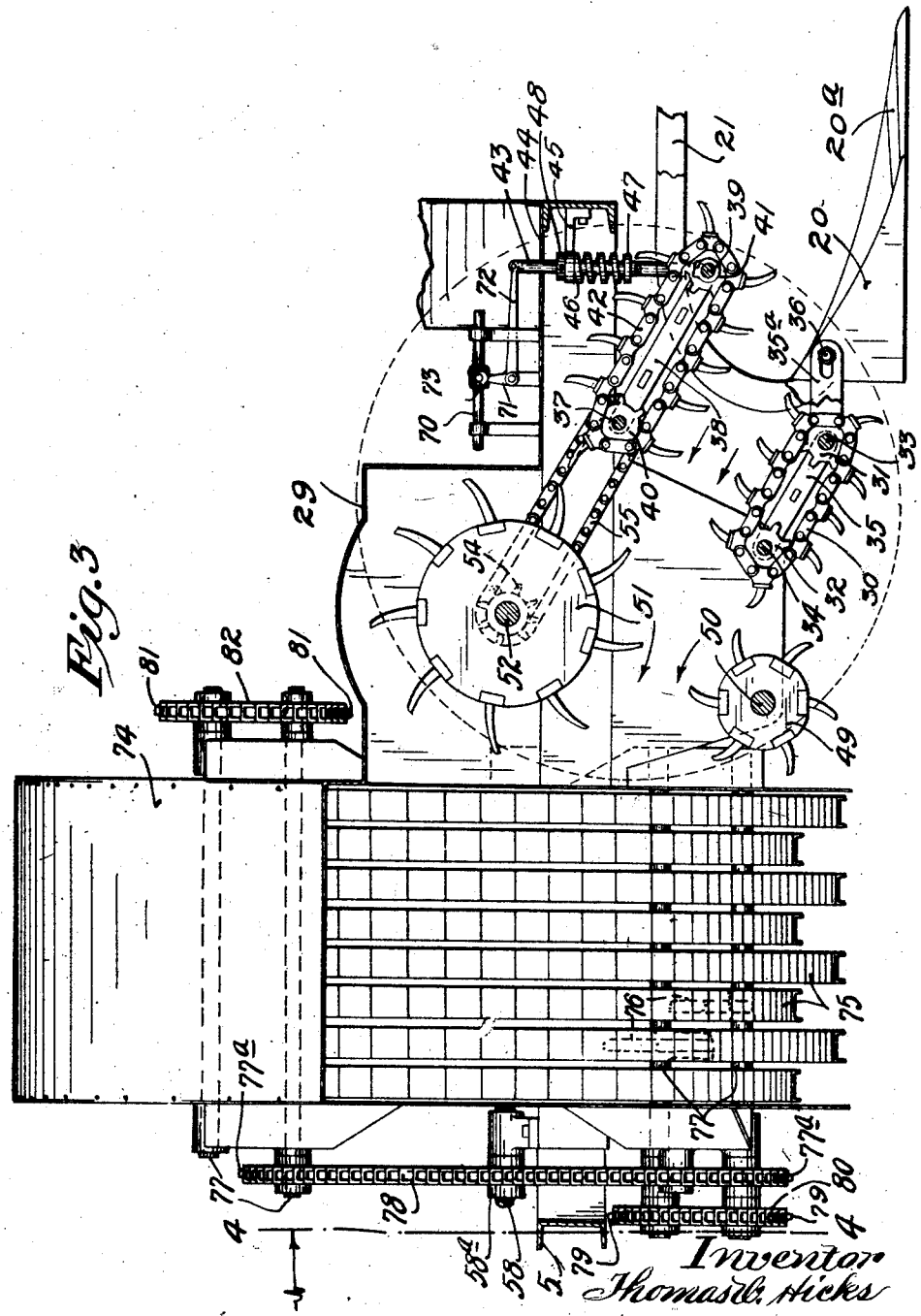

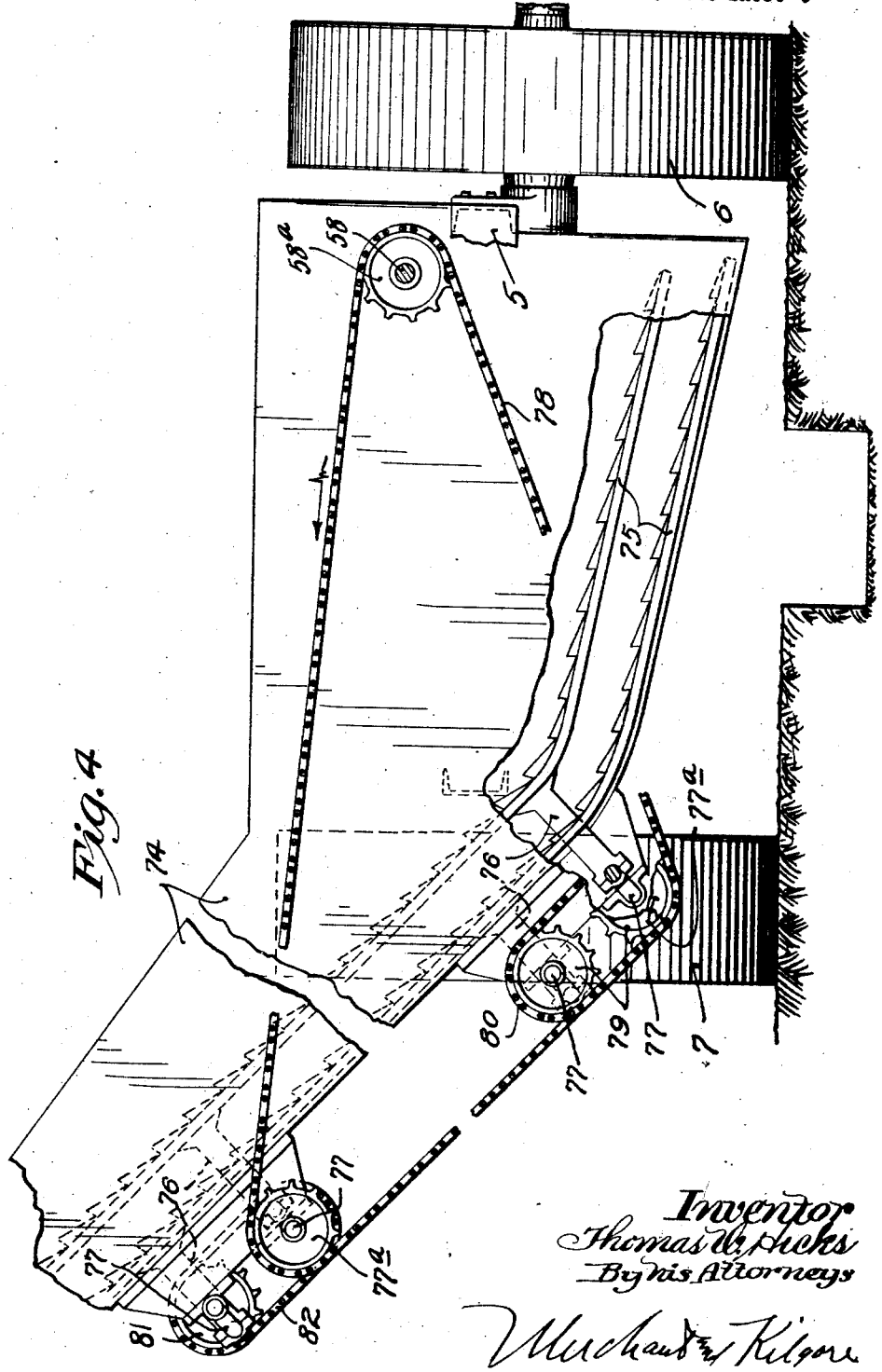

Patented Aug. 24, 1926.

1,597,234

UNITED STATES PATENT OFFICE.

THOMAS W. HICKS, OF MINNEAPOLIS, MINNESOTA, ASSIGNOR TO POWER FARMING MACHINERY CO., OF MINNEAPOLIS, MINNESOTA, A CORPORATION OF DELAWARE.

WEED EXTRACTOR.

Application filed May 3, 1922. Serial No. 558,182.

My present invention has for its object to provide a highly efficient machine for digging from the earth and separating from the uplifted earth, destructive weeds or other noxious plant growth, such as quack grass, witch grass, sow thistle, docks and the like.

It is a well known fact that thousands of acres of otherwise good farm lands are, at the present time, rendered nearly or quite useless, for the reason that they are overrun with weeds, such as quack grass (*Agropyrum repens*). The roots of this quack grass grow shallow under the surface of the ground and form an intermatted network of roots that can be completely destroyed only by digging them out and separating them from the soil and then burning the remains.

A machine that will remove quack grass from the earth, and separate the same from the uplifted earth, will do likewise with any other kind of weed growth or the like and, hence, in designing this improved machine, I have had in mind, primarily, the extraction and destruction of quack grass roots, and secondarily, all noxious weeds and wild growths.

The weed-extracting machine is made as a complete unit, which is adapted to be pulled by a tractor or drawn by horses, but the running mechanism thereof, in either instance, will be motor-driven.

A weed extractor designed for the purpose above described is illustrated in the accompanying drawings, wherein like characters indicate like parts throughout the several views.

Referring to the drawings:—

Fig. 1 is a side elevation showing the weed extractor designed and arranged to be drawn by horses;

Fig. 1ª shows the weed extractor coupled to and arranged to be drawn by a two-wheeled tractor;

Fig. 2 is a plan view with some parts broken away, showing the weed extractor proper;

Fig. 3 is a vertical section taken on the line 3—3 of Fig. 2; and

Fig. 4 is a transverse vertical section taken approximately on the line 4—4 of Fig. 3.

The weed extractor units, Fig. 1, have a rectangular horizontally disposed frame 5 carried by laterally spaced wheels 6 and 7. To adapt the truck, made up of said frame 5 and wheels 6 and 7, to be drawn by horses, said frame 5, at its front end, is rigidly but detachably connected to a supplemental frame or frame extension 8, preferably by means of bolts and coupling plates 9.

Rigidly secured to the front end of the supplemental frame 8 is a bearing bracket 10, to which is rigidly secured the upper end of a depending post 11; and on this post is swiveled a flanged draft-head 12 and the fork 13 of a caster wheel 14, which latter carries the main part of the front portion of the truck load. The numeral 15 indicates a clevis, which is attached to the front flange of the draft head 12 and to which a draft equalizer may be connected when the machine is to be drawn by horses.

The numeral 16 indicates an upright post pivoted in a bearing on the supplemental frame 8 and having a crank-like lower end on which an obliquely set gauge wheel 17 is loosely journaled. To the upper end of the post 16 is secured a head 18, to which is pivoted the rear end of the steering pole 19. When horses are hitched to the machine, the pole 19 will be suitably connected to the neck yoke or to one of the neck yokes. The castor wheel 14 will run upon the unplowed ground while the gauge wheel 17 will run in the furrow and crowd against the side of the furrow to release the side-draft and also to assist in guiding the machine to a very considerable extent.

For uplifting a flat ribbon-like furrow $y$ from the earth, I provide a substantially flat plow 20, which is secured to the rear end of a plow beam 21. The flat plow bottom 20 has a detachable point or shearing edgs 20ª, the rear part of which carries flanges which fit into a groove or grooves cut under the surface of the flat mold-board. This arrangement of flanges into fitted grooves holds the plow point, cut or shearing edge securely in position, yet allows it to be detached and a sharper point or shear put into its place while the dulled point is being resharpened. The front end of said beam 21 is pivotally attached to the rear flange of the draft-head 12.

For raising and lowering the plow and its beam, I provide a latch lever 22 pivoted to and co-operating with the notched latch arch 23 rigidly secured on the supplemental frame 8. At its lower end, the lever 22 has a lateral projection that is connected by a link 24 to a bracket 25 on the plow beam 21.

The numeral 26 indicates a sharp disk or colter, which is journaled to a caster-acting arm 27 connected to the plow beam by a post 28 depending from the latter.

Mounted on the main frame 5, just rearward of the motor 67, is a housing 29 formed open at its bottom and at the rear.

The ribbon of earth y, as it is delivered from and over the top of the plow 20, is directed immediately between two positively power-driven endless toothed conveyor belts 30 and 42 preferably made up of sprocket chains having toothed links. The chains of these belts run over sprocket wheels 31 and 32, and 40 and 41, (see Fig. 3), carried, respectively, by shafts 33 and 34, and 37 and 39. The shaft 34 is extended through and journaled in suitable bearings in the depending sides of the housing 29, and the shaft 33 is journaled in the lower end of an inclined frame 35, the upper rear end of which frame is pivoted on the shaft 34. At its lower end, said frame 35 is provided with rigid laterally spaced forwardly projecting extensions 35ª, shown as pivotally and slidably connected to the sides of the upper rear portion of the plow 20 by slot and bolt connections at 36.

Journaled in bearings on the sides of the housing 29 and extending transversely therethrough is a shaft 37 located high above the toothed conveying belt 30. A conveyor frame 38 is pivoted on the shaft 37 and, at its forward lower end, carries a shaft 39. The shafts 37 and 39 carry sprockets 40 and 41, over which run toothed sprocket chains 42 that constitute a toothed overhead power-driven conveyor feed belt. The ends of the shaft 39 are also journaled in the lower ends of vertically movable plungers 43 that work through a deck 44 on the front portion of the frame 5. Said plungers 43 also work through brackets 45 in the front portion of the frame 5. A coiled spring 46 is placed around at least one of the plungers 43 and is compressed between the co-operating bracket 45 and a collar 47 fixed on said plungers. This spring yieldingly presses the free front portion of the overhead feed belt down as far as permitted by an adjustable collar 48 fixed on said plunger. Here it is important to note that the overhead toothed feed belt is power-driven and extends far in front of the lower toothed feed belt and works directly over the top of the plowshare, where it will take positive hold of the uplifted furrow and forcibly feed the furrow slice back into the machine until the furrow is engaged by the lower toothed feed belt, and then both upper and lower feed belts force the furrow slice directly into contact with the teeth of the threshing cylinders 49 and 51.

Mounted to receive from the lower toothed feed belt 30, is a lower toothed threshing cylinder 49, the shaft 50 of which is journaled in suitable bearings on the lower portion of the sides of the housing 29. Located at a considerable distance above the lower threshing cylinder 49 is an upper toothed threshing cylinder 51, preferably larger than said cylinder 49 and the shaft 52 of which is journaled in suitable bearings on the sides of the housing 29. At one end, near its other end, it is provided with a sprocket 54. The position of the upper cylinder 51 being stationed exactly 33⅓% forwardly of the position of the lower threshing cylinder 49 is an important factor of this application and has much to do with the practicability of the machine. The same is also true of the difference in size of the upper threshing cylinder 51 and the lower threshing cylinder 49, the upper threshing cylinder 51 having a total diameter of eighteen inches against the total diameter of ten inches of the lower cylinder 49. A sprocket chain 55 runs over the sprocket 54 and over a sprocket 56 on the sprocket shaft 37.

The bevel gear 53 meshes with a bevel driving pinion 57 carried by a longitudinal shaft 58 mounted in suitable bearings on one side of the main frame 5. The pinion 57, driven directly from the motor through a clutch, meshes with a bevel gear 59 carried by a short transverse shaft 60 journaled in a suitable bearing on said frame 5 and provided on its outer end with a sprocket 61. A sprocket chain 62 runs over the sprocket 61 and over a sprocket 63 on the corresponding end of the cylinder shaft 50. Said cylinder shaft 50, adjacent to the sprocket 63, is provided with a similar sprocket 64, over which and a sprocket 65 on the sprocket shaft 34, runs a sprocket chain 66.

In the construction illustrated in Fig. 1, the motor for driving the running parts of the machine is preferably a multi-cylinder explosive engine 67 rigidly secured on the front portion of the main frame 5 near one side thereof and its crank shaft is arranged to be connected to the front end of the shaft 58 by a friction clutch 68, best shown in Fig. 2, of any suitable construction, but which is adapted to be pressure-released by a suitable clutch-actuating fork 69 shown as secured to a sliding bolt 70 mounted in suitable bearings on the deck 44. Mounted in other bearings on the deck 44 is a short transverse rocker arm shaft 71 provided with a forwardly projecting arm 72 pivotally connected to the upper end of one of the plungers 43, and provided with an upwardly extended arm 73 that is pivotally connected to the sliding bolt 70 (see particularly Figs. 2 and 3).

The arrangement just described is such that, when the front end of the overhead toothed feed belt 42 is raised to a predetermined extent, the clutch 68 will be opened but, normally, the springs 46 will hold said upper toothed belt in such lowered position that the clutch 68 will remain in action and the power of the engine will be transmitted to the running parts of the machine.

Suitably secured to the rear portion of the main frame 5 and extending across the same and projecting from one side thereof, is an elevator housing 74, into the lower portion of which the toothed threshing cylinders 49 and 51 are adapted to disintegrate and separate the weeds from the earth of the lifted furrow. Working along the inclined bottom of this elevator housing is a conveyor, preferably made up of laterally spaced toothed tedder-acting conveyor bars 75. These conveyor bars 75 are provided with depending legs 76 journaled on crank shafts 77 mounted in suitable bearings on the bottom of said housing 75. There are four of these crank shafts 77 arranged in pairs, the members of the pairs of crank shafts being arranged to rotate in parallel and the two pairs of crank shafts being arranged to alternate the movements of the conveyor slats 75 and thereby more thoroughly separate the weeds and roots from the soil of the furrow slice.

At their rear ends, the lowermost crank shaft 77 and the next to the uppermost crank shaft 77 are provided with sprockets 77$^a$, and a long sprocket chain 78 which runs over said sprockets and over a driving sprocket 58$^a$ on the driving shaft 58 (see Figs. 3 and 4). At their rear ends, the two lower crank shafts 77 are provided with sprockets 79 over which runs a sprocket chain 80. At their front ends, the two uppermost shafts 77 are provided with sprockets 81 over which runs a sprocket chain 82.

In the arrangement illustrated in Fig. 1$^a$, the weed extractor unit is arranged to be drawn by a two-wheel tractor, of the parts of which it is only desirable to particularly note the main frame 83, traction wheels 84 and engine 85. The tractor frame 83 is here provided with a vertical coupling fork 86 that is pivotally connected to a coupling fork 87 secured on the front end of the coupling shaft 88. This coupling shaft 88 is swiveled in the upper portion of an arched bridge bracket 89 that is rigidly but detachably secured to the front end of the main frame 5. The coupling shaft 88 should be provided with a swivel so as to permit the rear wheels 6 and 7, as well as the tractor wheels 84, to adapt themselves to irregularities in the ground. Also, in this arrangement, the power for driving the running parts of the weed extractor unit, instead of being supplied by an engine carried on the frame 5, may be driven from the tractor engine through a knuckle-jointed telescopic shaft 90.

For most purposes, however, the arrangement illustrated in Fig. 1 will be employed. With said arrangement illustrated in Fig. 1, the engine 67 will remain on the frame 5 and be used to drive the running parts of the weed extractor, whether the machine is being drawn by horses or by a tractor. If drawn by a tractor when the supplemental frame and its supporting wheels are used as shown in Fig. 1, the coupling to the tractor may be made through the clevis 15; or the supplemental frame may be removed and the machine can be coupled to the tractor in any other suitable way.

In Fig. 1, the numeral 91 indicates the operator's seat suitably supported from the deck 44. In Fig. 1$^a$, the numeral 92 indicates the operator's seat suitably supported from the top of the housing 29.

Operation.

When the machine is moved forward, the plow 20 will, of course, uplift a furrow or ribbon of earth, the upper portion of which, where quack grass or other weed roots prevail, will contain a thick network of roots and underground rootstalks much longer than and frequently much tougher than ordinary sod. As this ribbon of earth passes the upper portion of the plow and before it leaves the plow, the matted sod-like upper surface thereof will be engaged by the teeth of the upper power-driven positive feed belt 42 and will be accelerated, that is, will be moved faster than the lower portion of the earth ribbon. As the earth ribbon moves from the plow, it falls onto the lower power-driven toothed feed belt 30 and the ribbon of sod will positively be moved bodily rearward. The positive power-driven toothed feed belts constitute a cardinal feature of this machine. Earth containing weed and grass roots of the "runner" variety is extremely hard to handle and will not "feed" naturally as will ordinary sod or soil. Therefore, the contact made with the ribbon of earth early in the act of handling the same by this machine, as is done by the position and action of the upper toothed feed belt and the successive engagement of the bottom of the furrow by the lower power-driven toothed feed belt, which, in turn, aids and assists the upper feed belt in grabbing, retaining and forcibly conveying the matter roots and earth directly into the toothed threshing cylinders and pulling the sod apart during the act of conveying it, is a special feature of the above described mechanism. The driving connections are such that the upper toothed feed belt 42 will be moved faster than the lower feed belt 30 and, in fact, both feed belts should be moved faster than the forward movement of the machine. This causes early stretching, loosening, crumbling and separation of the earth and roots by causing the upper portion thereof to be moved faster than the lower portion, and hence, to be given a sort of preliminary disintegrating action that has very great efficiency in breaking up the solid mass of the earth and loosening up the roots therefrom.

From the two feed belts 42 and 30, the broken ribbon of earth will be fed between the lower and upper toothed threshing cylinders 49 and 51, and, by these two toothed cylinders, the earth will be very completely disintegrated and loosened from the quack grass or weed roots. Moreover, the upper toothed cylinder 51 has a much greater peripheral speed than the lower cylinder 49, so that the loosened roots will be thrown into the lower portion of the transverse housing 74 and onto the vibratory or tedder-acting separators consisting of the toothed elevator conveyor bars 75. In the movement of the earth and roots between the toothed feed belts and toothed disintegrating cylinders, most of the earth will be dropped onto the ground, but some of the earth will go with the roots into the housing 74 and onto the vibratory separating elevator conveyor bars 75. The latter, it will be noted, are spaced apart, as best shown in Fig. 3, so that all of the dirt will be separated and shaken from the roots and dropped to the bottom of the sheet iron housing 74, and redeposited into the open furrow at the rear of the machine. These elevator conveyor bars 75 are of peculiar construction, being about six inches wide and one inch thick, set on edge, with the upper edge notched so that, as the first bar is at its top position, in the act of elevating and conveying, and the second bar is at its lower position, the bars are wide enough to prevent any opening appearing between the two bars or the grooved space between the bars, so that no loss of dirt or roots through such openings occurs; and this construction also prevents a shearing or cutting of the roots by the action of the bars. The cutting off of small parts of roots and losing some through such openings would defeat the whole purpose of the machine. The clean roots will be discharged at the upper end of the housing 74 and may be caught in a suitable receptacle, such as a wagon driven at the side of the machine, or may be dropped in a row on the ground where they may be burned or otherwise disposed of.

If, at any time, there should be an over-accumulation of the earth and roots between the lower and upper toothed feed belts or a rock or bunch of tree roots, such as would likely break or clog the toothed threshing cylinders and possibly cause breakage of the gears or the parts of the driving mechanism, such accumulation of earth and roots will raise the forward free end of the frame 38 against the tension of the spring 46 and, acting through the described connections 72, 71, 73, 70 and 69, will open or release the friction clutch 68 and thus disconnect the engine from the driving mechanism.

This machine, while especially designed and particularly adapted for eradication of quack grass roots, will, nevertheless, be found equally efficient for digging up and separating from the soil all noxious roots or plant growth.

What I claim is:—

1. In a weeding implement, a plow, a pair of vertically spaced toothed conveyor belts for receiving earth from the plow, a pair of vertically separated toothed cylinders for receiving earth from the belts, the uppermost cylinder having a relatively larger diameter than the lower cylinder, the upper belt being driven at a higher speed than the lower belt, and the upper cylinder having a higher peripheral speed than the speed of travel of the upper belt whereby vegetative growth will be separated from the earth raised by the plow.

2. In a weeding implement, a plow, a pair of vertically spaced toothed conveyor belts for receiving earth from the plow, a pair of vertically separated toothed cylinders for receiving earth from the conveyor belts, said lower cylinder being relatively small and permitting disintegrated earth to fall into the furrow, said upper cylinder being relatively larger than the lower cylinder and rotatable at a higher peripheral speed than the speed of travel of the lower cylinder and at a higher peripheral speed than the speed of travel of the upper belt.

3. In a weeding implement, a plow, a pair of vertically spaced toothed conveyor belts for receiving earth from the plow, a pair of vertically separated toothed cylinders for receiving earth from the conveyor belts, said lower cylinder being relatively small and permitting disintegrated earth to fall into the furrow, said upper cylinder being relatively larger than the lower cylinder and rotatable at a higher peripheral speed than the speed of travel of the lower cylinder and at a higher peripheral speed than the speed of travel of the upper belt, said upper belt and upper cylinder operating to pull vegetable growth from the engaged earth, and means for receiving the separated matter.

In testimony whereof I affix my signature.

THOMAS W. HICKS.